United States Patent
Yu

(10) Patent No.: US 8,690,168 B2
(45) Date of Patent: Apr. 8, 2014

(54) RECIPROCAL MOTOR TRICYCLE WITH LOCKABLE FRAME

(76) Inventor: Jinjun Yu, Ningbo (CN)

( * ) Notice: Subject to any disclaimer, the term of this patent is extended or adjusted under 35 U.S.C. 154(b) by 329 days.

(21) Appl. No.: 13/241,253

(22) Filed: Sep. 23, 2011

(65) Prior Publication Data

US 2012/0098220 A1  Apr. 26, 2012

(30) Foreign Application Priority Data

Oct. 23, 2010  (CN) .................. 2010 2 0577616 U

(51) Int. Cl.
*B62D 61/06* (2006.01)
*B62D 21/18* (2006.01)

(52) U.S. Cl.
USPC ..................... 280/62; 280/124.103

(58) Field of Classification Search
USPC ............ 280/5.509, 6.15, 6.155, 62, 124.103, 280/124.125, 124.134, 256
See application file for complete search history.

(56) References Cited

U.S. PATENT DOCUMENTS 6,367,824 B1 * 4/2002 Hayashi ........................... 280/62
7,568,541 B2 * 8/2009 Pfeil et al. ...................... 180/210
8,070,172 B1 * 12/2011 Smith et al. ............ 280/124.103
2007/0182120 A1 * 8/2007 Tonoli et al. ........... 280/124.142
2012/0098220 A1 * 4/2012 Yu .................................. 280/62
2012/0098225 A1 * 4/2012 Lucas .................... 280/124.103

FOREIGN PATENT DOCUMENTS

| CN | 201670315 | 12/2010 |
| CN | 102092435 | 6/2011 |

OTHER PUBLICATIONS

Chinese Search Report for Chinese Application No. 201020577616.2.

* cited by examiner

*Primary Examiner* — J. Allen Shriver, II
*Assistant Examiner* — Bridget Avery

(57) ABSTRACT

The present patent application provides a reciprocal motor tricycle with a lockable frame including a frame, two front wheels, a limiting plate, two balance plates, an upper rocker and lower rocker both connected between the frame and the front wheels, and a limiting block connected onto the balance plate. A directing mechanism is disposed between the frame and the front wheels. A damping mechanism is disposed between the balance plate and the lower rocker. A number of limiting grooves for working with the limiting block are disposed at the left and right of the limiting plate. A fixing plate is disposed at a lower portion of the frame. The balance plate and the fixing plate are movably connected.

3 Claims, 3 Drawing Sheets

RECIPROCAL MOTOR TRICYCLE WITH LOCKABLE FRAME

FIELD OF THE PATENT APPLICATION

The present patent application relates to a motor vehicle and more specifically to a reciprocal motor tricycle with a lockable frame.

BACKGROUND

The applicant of the present patent application has a prior utility model application in China titled "Reciprocal Motor Tricycle", which discloses a reciprocal motor tricycle. The reciprocal motor tricycle includes a damping mechanism hinged between the lower rocker and the balance plate and the balance plate can rotate left and right relative to the frame through the hollow shaft at the bottom thereof, so that the frame is not limited by the damping mechanism and is capable of being tilted left and right at a large scale. As a result, sufficient positive pressure can be produced between the inner wheel of the vehicle and the ground so as to balance the centrifugal force on the vehicle and thereby effectively improve the anti-rollover capability of the vehicle during turns. However, when the reciprocal motor tricycle is running straightly on a road with bad conditions, because the frame is always in a swinging mode, when the ups and downs are frequent, the frame of the reciprocal motor tricycle will be hard to be kept in balance and swing left and right easily. As a result, the driver riding on the motor tricycle may fall off from the vehicle because of the unstable center of mass, so that the personal safety of the driver will be jeopardized.

SUMMARY

The technical problem that the present patent application is intended to solve is to provide a reciprocal motor tricycle with a lockable frame, which not only has a high anti-rollover capability when turning, but also has a frame that can be locked anytime so that the frame cannot swing left and right, thereby having a greatly improved safety.

To solve the above technical problem, the present patent application provides a reciprocal motor tricycle with a lockable frame including a frame, two front wheels, a limiting plate, two balance plates, an upper rocker and lower rocker both connected between the frame and the front wheels, and a limiting block connected onto the balance plate. A directing mechanism is disposed between the frame and the front wheels. A damping mechanism is disposed between the balance plate and the lower rocker. A number of limiting grooves for working with the limiting block are disposed at the left and right of the limiting plate. A fixing plate is disposed at a lower portion of the frame. The balance plate and the fixing plate are movably connected. A locking mechanism is disposed between the frame and the balance plate and configured for preventing the frame from swinging left and right at anytime. The limiting plate is connected onto the locking mechanism.

In the reciprocal motor tricycle with a lockable frame provided by the present patent application, the locking mechanism includes a lock string, a limiting frame, a locking fixed plate, a locking moving rod, a locking bolt, a spring, a locking bolt cover, a lock cover, a U-shaped block and a locking switch that can be installed to the handle. The lock cover is fixedly connected between the two balance plates. The locking fixed plate is welded to the frame. The limiting frame and locking bolt cover are both connected to the locking fixed plate. The locking moving rod is hinged with the two inner walls of the limiting frame. The upper portion of the locking moving rod is hinged with the U-shaped block. One end of the locking bolt is hinged with the lower portion of the locking moving rod, while the other end of the locking bolt is slidably inserted into the locking bolt cover. One end of the lock string is connected with the U-shaped block, while the other end of the lock string is connected with the locking switch. The spring is covered on the locking bolt and pushed between the locking bolt and the locking bolt cover. The locking bolt, the locking bolt cover and the lock cover share a same axis. The limiting plate is connected with the locking fixed plate.

The reciprocal motor tricycle with a lockable frame provided by the present patent application further includes a touch switch installed on the locking fixed plate. The touch switch is electrically connected with the dashboard of the motor tricycle. A locking indicating light is configured on the dashboard.

The reciprocal motor tricycle with a lockable frame provided by the present patent application further includes a speed limiter that may be connected to the frame and a magneto configured to control the rotation speed of the motor. The speed limiter is electrically connected with the touch switch. The magneto is electrically connected with the speed limiter.

With the above-mentioned structure, the reciprocal motor tricycle with a lockable frame provided by the present patent application has the following advantages. Because there is a locking mechanism disposed between the frame and the balance plate of the reciprocal motor tricycle with a lockable frame and configured to prevent the frame from swinging left and right, when the vehicle is running on a road in relatively bad conditions, the driver can lock the frame and the balance plate by controlling the locking mechanism. The balance plate, under the support of the damping mechanism, is always in a vertical mode. As a result, the frame, which is locked with the balance plate, is always in a vertical mode so that the frame will be kept in balance without swinging left and right even when frequently shaking, and the driver riding the motor tricycle will maintain a stable center of mass and not fall off from the vehicle easily, thereby ensuring the personal safety of the driver. When the reciprocal motor tricycle with a lockable frame provided by the present patent application is turning, the driver can disable the locking mode between the frame and the balance plate by controlling the locking mechanism, and restore the frame to a mode in which it can swing left and right, so that the anti-rollover capability of the vehicle during turns is effectively improved. Therefore, the reciprocal motor tricycle with a lockable frame provided by the present patent application not only has a high anti-rollover capability when turning, but also has a frame that can be locked anytime so that the frame can not swing left and right, thereby having a greatly improved safety.

The function of the touch switch and the locking indicating light configured on the dashboard of the reciprocal motor tricycle with a lockable frame provided by the present patent application is to inform the driver in a direct way whether the frame is in a locked mode so as to further ensure the personal safety of the driver.

The function of the speed limiter of the reciprocal motor tricycle with a lockable frame provided by the present patent application is to limit the speed of the vehicle to a certain range at the same time as the frame is locked so as to effectively prevent the vehicle from rolling over due to turning at a too high speed when the frame is locked, and thereby to further ensure the personal safety of the driver.

BRIEF DESCRIPTIONS OF THE DRAWINGS

DETAILED DESCRIPTION

Reference will now be made in detail to a preferred embodiment of the reciprocal motor tricycle with a lockable frame disclosed in the present patent application, examples of which are also provided in the following description. Exemplary embodiments of the reciprocal motor tricycle with a lockable frame disclosed in the present patent application are described in detail, although it will be apparent to those skilled in the relevant art that some features that are not particularly important to an understanding of the reciprocal motor tricycle with a lockable frame may not be shown for the sake of clarity.

Furthermore, it should be understood that the reciprocal motor tricycle with a lockable frame disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
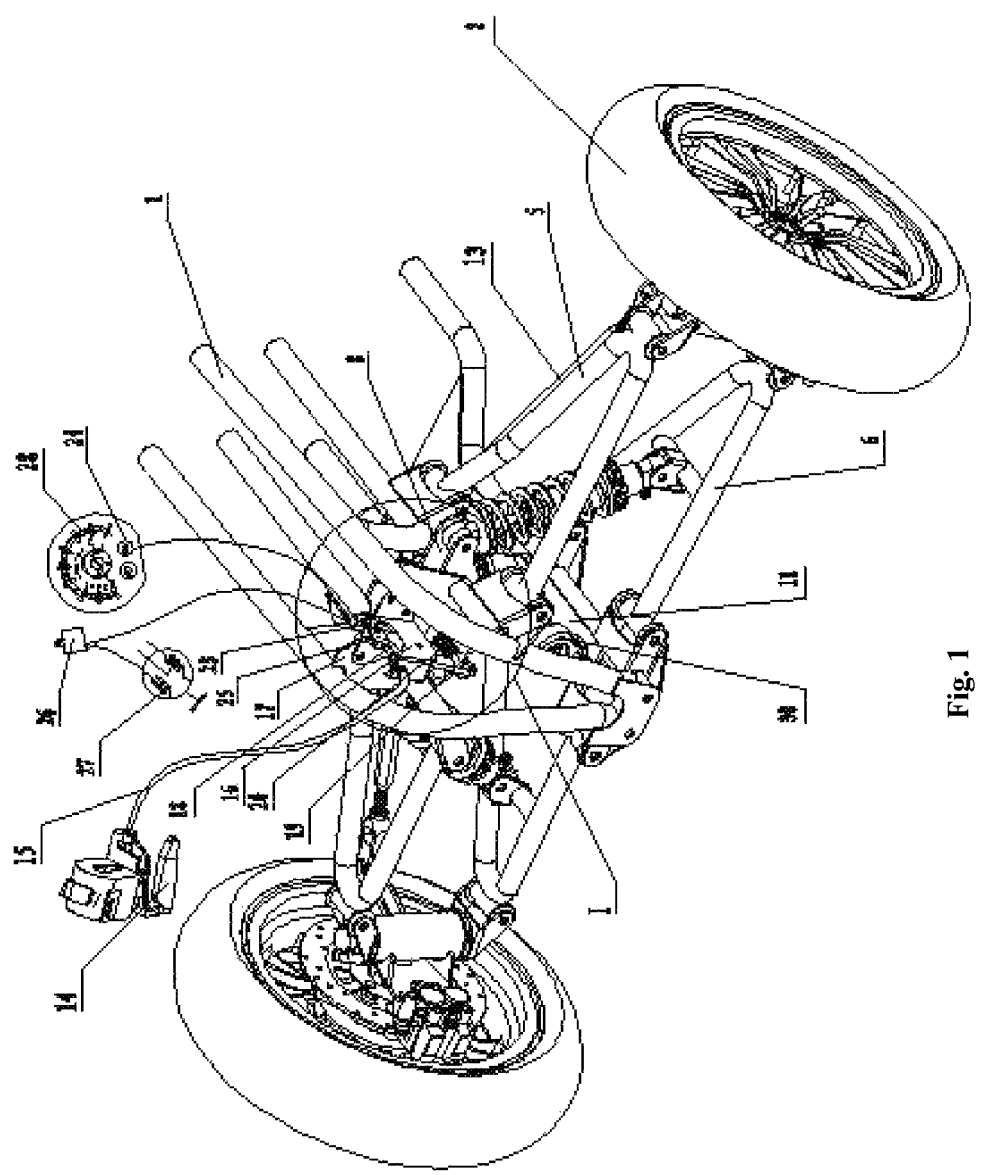
FIG. 1 illustrates the structure of a head portion of a reciprocal motor tricycle with a lockable frame according to the present patent application.
Figure 2:
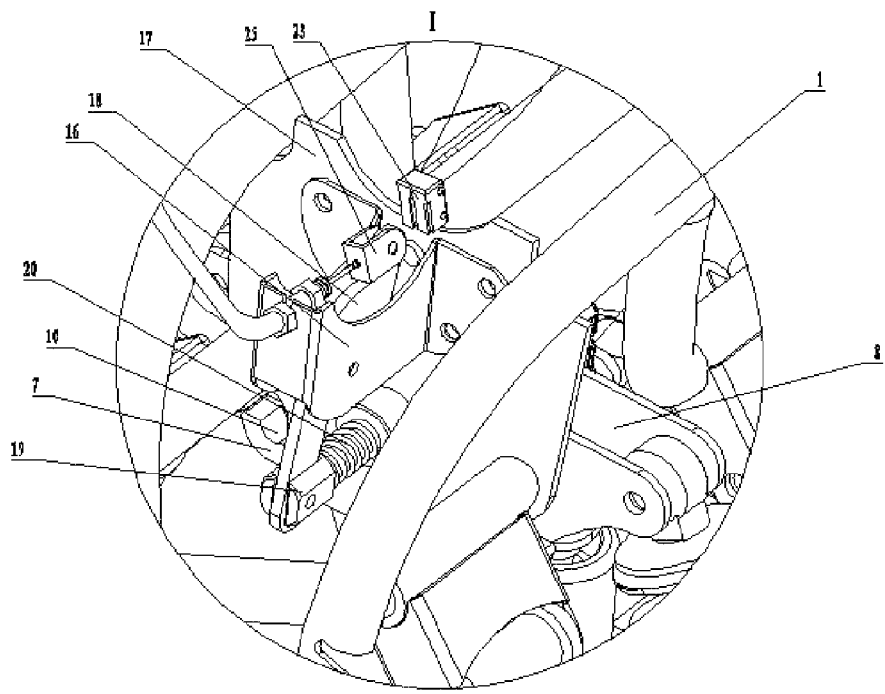
FIG. 2 is an enlarged view of the region I in FIG. 1.
Figure 3:
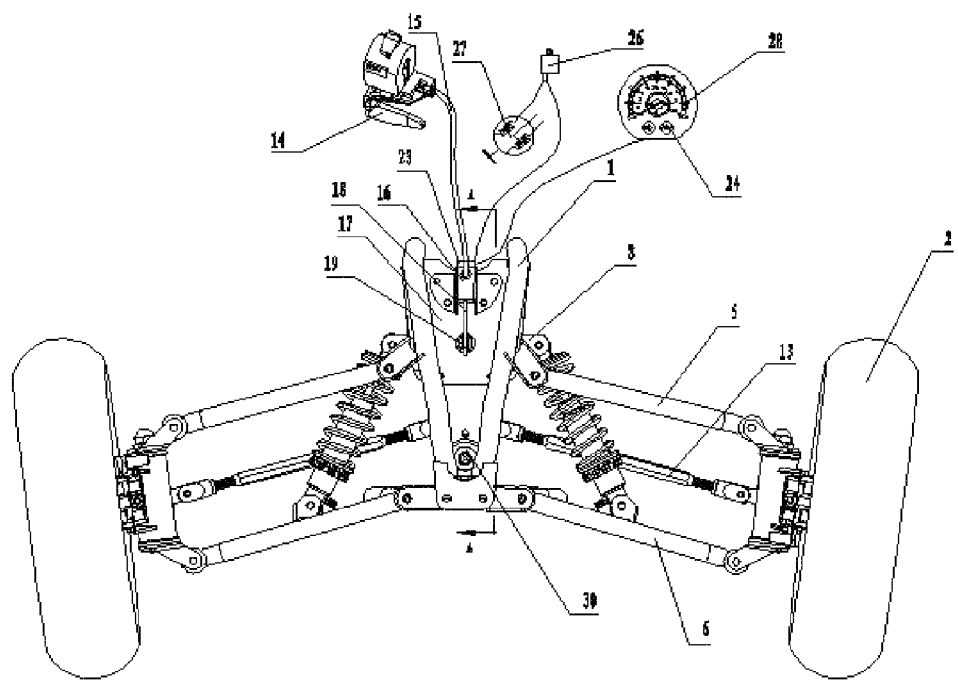
FIG. 3 is a front partial view of the head portion of the reciprocal motor tricycle with a lockable frame according to the present patent application.
Figure 4:
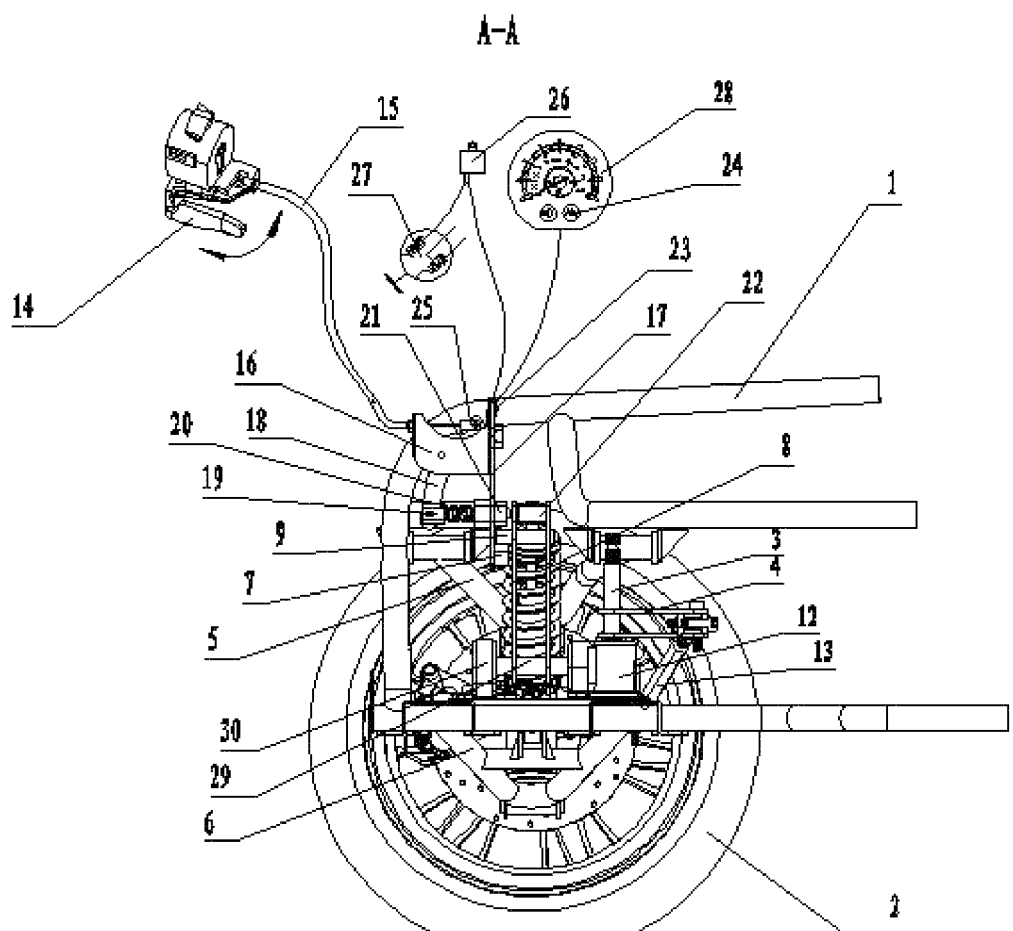
FIG. 4 is a cross-sectional view along the line A-A in FIG. 3.

Referring to FIG. 1, FIG. 2, FIG. 3 and FIG. 4, in an embodiment, the reciprocal motor tricycle with a lockable frame according to the present patent application includes a frame 1, two front wheels 2, a limiting plate 7, two balance plates 8, two damping mechanisms, a back wheel connected with the frame 1 (not shown in the figures), an upper rocker 5 and lower rocker 6 both connected between the frame 1 and the front wheels 2, and a limiting block 9 connected onto the balance plate 8. A directing mechanism is disposed between the frame 1 and the front wheels 2. The directing mechanism includes a handle (not shown in figures), a direction rod (not shown in figures), a direction rod connector 3, a turning arm 4, a bearing base 12 and two turning rods 13. The upper end of the direction rod is welded with the handle. The lower end of the direction rod is connected with the direction rod connector 3. The lower end of the direction rod connector 3 is connected with the bearing base 12. One end of the turning arm 4 is fixedly connected with the direction rod connector 3, while the other end of the turning arm 4 is hinged with the ends of the two turning rods 13. The other ends of the two turning rods 13 are respectively hinged with the two front wheels 2. The ends of the two damping mechanisms are respectively hinged with the left and right ends of the balance plate 8. The other ends of the damping mechanisms are respectively hinged with the lower rockers 6. The damping mechanisms of the reciprocal motor tricycle with a lockable frame according to the present patent application are conventional and hence no excessive description will be made to them. Limiting grooves 10 for working with the limiting block 9 are disposed at the left and right of the limiting plate 7. A fixing plate 11 is disposed at a lower portion of the frame 1. A rotating shaft 29 is fixedly connected to the bottom of the balance plate 8. Two rotating shaft bases 30 are fixedly connected to the fixing plate 11. The two ends of the rotating shafts 29 are respectively connected with the two rotating shaft bases 30. A locking mechanism is disposed between the frame 1 and the balance plate 8 and configured for preventing the frame 1 from swinging left and right at anytime. The locking mechanism includes a lock string 15, a limiting frame 16, a locking fixed plate 17, a locking moving rod 18, a locking bolt 19, a spring 20, a locking bolt cover 21, a lock cover 22, a U-shaped block 25, a locking switch 14 that can be installed to the handle, a speed limiter 26 that may be connected to the frame 1 and a magneto 27 configured to control the rotation speed of the motor. The lock cover 22 is fixedly connected between the two balance plates 8. The locking fixed plate 17 is welded to the frame 1. The limiting frame 16 and locking bolt cover 21 are both fixedly connected to the locking fixed plate 17. The locking moving rod 18 is hinged with the two inner walls of the limiting frame 16. The upper portion of the locking moving rod 18 is hinged with the U-shaped block 25. One end of the locking bolt 19 is hinged with the lower portion of the locking moving rod 18, while the other end of the locking bolt 19 is slidably inserted into the locking bolt cover 21. One end of the lock string 15 is connected with the U-shaped block 25, while the other end of the lock string 15 is connected with the locking switch 14. The spring 20 is covered on the locking bolt 19 and pushed between the locking bolt 19 and the locking bolt cover 21. The locking bolt 19, the locking bolt cover 21 and the lock cover 22 share a same axis. The limiting plate 7 is connected with the locking fixed plate 17. A touch switch 23 is installed on the locking fixed plate 17. The touch switch 23 is electrically connected with the dashboard 28 of the motor tricycle. A locking indicating light 24 is configured on the dashboard 28. The speed limiter 26 is electrically connected with the touch switch 23. The magneto 27 is electrically connected with the speed limiter 26.

The working principle of the reciprocal motor tricycle with a lockable frame according to the present patent application is the following. When the vehicle is running on a road in relatively bad conditions, if the locking switch 14 is turned left, the "left" in this embodiment referring to the left side in FIG. 4 and the "right" in this embodiment referring to the right side in FIG. 4, pulled by the locking switch 14, the lock string 15 will pull the locking moving rod 18 and turn it in an anti-clockwise direction. Pushed by the locking moving rod 18, the locking bolt 19 moves toward right and eventually inserts its right end into the lock cover 22 connected to the balance plate 8. At this moment, the upper end of the locking moving rod 18 is disengaged with the spring plate of the touch switch 23 connected to the upper portion of the locking fixed plate 17. As a result, the touch switch 23 is in an open mode, and the locking indicating light 24 configured on the dashboard is turned on, indicating the frame 1 is locked. In the meanwhile, the speed limiter 26 receives the signal from the touch switch 23 and controls the magneto 27 to limit the speed of the motor (not shown in figures), so that while the frame 1 is locked the speed of the vehicle can be limited to a certain range, so as to effectively prevent the vehicle from rolling over due to turning at a too high speed when the frame 1 is locked, and thereby to effectively ensure the personal safety of the driver. When the vehicle needs to be tilted in order to improve the anti-rollover capability of the vehicle, the locking switch 14 can be turned back to right, and the upper portion of the locking moving rod 18 is no longer pulled by the lock string 15. The locking bolt 19, under the spring force from the spring 20, moves toward left so that the right end of the locking bolt 19 leaves the lock cover 22. The locking moving rod 18 is pushed by the locking bolt 19 and turning in a clockwise direction and eventually makes the upper portion of the locking moving rod 18 touch and press tightly against the spring plate of the touch switch 23. Now the touch switch 23 is closed. The locking indicating light 24 configured on the dashboard is not turned on, indicating that the frame 1 is not locked and the speed limiter 26 stops working.

While the present patent application has been shown and described with particular references to a number of embodiments thereof, it should be noted that various other changes or modifications may be made without departing from the scope of the present invention.

What is claimed is:

1. A reciprocal motor tricycle with a lockable frame comprising:
    a frame (1);
    two front wheels (2);
    a limiting plate (7);
    two balance plates (8);
    an upper rocker (5) and lower rocker (6) connected between the frame (1) and the front wheels (2); and
    a limiting block (9) connected onto the balance plate (8);
    a directing mechanism being disposed between the frame (1) and the front wheels (2);
    a damping mechanism being disposed between the balance plate (8) and the lower rocker (6);
    a plurality of limiting grooves (10) for working with the limiting block (9) being disposed at the left and right of the limiting plate (7);
    a fixing plate (11) being disposed at a lower portion of the frame (1);
    the balance plate (8) and the fixing plate (11) being movably connected; wherein:
    a locking mechanism is disposed between the frame (1) and the balance plate (8) and configured for preventing the frame (1) from swinging left and right at anytime;
    the limiting plate (7) is connected onto the locking mechanism; and wherein:
    the locking mechanism comprises a lock string (15), a limiting frame (16), a locking fixed plate (17), a locking moving rod (18), a locking bolt (19), a spring (20), a locking bolt cover (21), a lock cover (22), a U-shaped block (25) and a locking switch (14) that can be installed to a handle, the lock cover (22) being fixedly connected between the two balance plates (8), the locking fixed plate (17) being welded to the frame (1), the limiting frame (16) and locking bolt cover (21) being both connected to the locking fixed plate (17), the locking moving rod (18) being hinged with two inner walls of the limiting frame (16), the upper portion of the locking moving rod (18) being hinged with the U-shaped block (25), one end of the locking bolt (19) being hinged with the lower portion of the locking moving rod (18), while the other end of the locking bolt (19) being slidably inserted into the locking bolt cover (21), one end of the lock string (15) being connected with the U-shaped block (25), while the other end of the lock string (15) being connected with the locking switch (14), the spring (20) being covered on the locking bolt (19) and pushed between the locking bolt (19) and the locking bolt cover (21), the locking bolt (19), the locking bolt cover (21) and the lock cover (22) sharing a same axis, the limiting plate (7) being connected with the locking fixed plate (17).

2. The reciprocal motor tricycle with a lockable frame of claim 1 further comprising a touch switch (23) installed on the locking fixed plate (17), wherein the touch switch (23) is electrically connected with a dashboard (28) of the motor tricycle, and a locking indicating light (24) is configured on the dashboard (28).

3. The reciprocal motor tricycle with a lockable frame of claim 2 further comprising a speed limiter (26) that can be connected to the frame (1) and a magneto (27) configured to control the rotation speed of the motor, wherein the speed limiter (26) is electrically connected with the touch switch (23), and the magneto (27) is electrically connected with the speed limiter (26).

* * * * *